United States Patent
Hong et al.

(10) Patent No.: US 7,193,935 B2
(45) Date of Patent: Mar. 20, 2007

(54) METHOD AND APPARATUS FOR CONTROLLING POSITIONING OF A PICKUP

(75) Inventors: Dong-ki Hong, Gyeonggi-do (KR); Jee-hyung Park, Seoul (KR); Soo-yul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/445,025

(22) Filed: May 27, 2003

(65) Prior Publication Data

US 2004/0013053 A1    Jan. 22, 2004

(30) Foreign Application Priority Data

Jul. 19, 2002    (KR)    ................. 2002-42478

(51) Int. Cl.
    G11B 21/08    (2006.01)
(52) U.S. Cl. .................. 369/30.27; 369/30.1
(58) Field of Classification Search ............ 369/30.27, 369/30.36, 30.1, 30.11, 30.12, 30.13, 30.14, 369/30.15, 44.28, 44.27, 44.29, 44.35, 33.01, 369/215

See application file for complete search history.

(56) References Cited

U.S. PATENT DOCUMENTS 4,723,235 A * 2/1988 Yasuda et al. ........... 369/30.12
5,633,840 A * 5/1997 Han ......................... 369/30.04
5,764,602 A * 6/1998 You et al. ................. 369/30.13
5,808,982 A * 9/1998 Yun ......................... 369/30.13
5,841,739 A * 11/1998 Iida et al. ................. 369/30.13
6,172,949 B1 * 1/2001 Ogata ....................... 369/30.1
6,414,915 B2 * 7/2002 Seo .......................... 369/30.1
6,504,804 B1 * 1/2003 Bamba ..................... 369/53.29
6,700,859 B2 * 3/2004 Oono et al. ................ 369/223
6,744,716 B1 * 6/2004 Takemoto ................. 369/53.19

FOREIGN PATENT DOCUMENTS

| JP | 59-213297 | 3/1984 | | |
| JP | 08-096533 | 4/1996 | | |
| JP | 8-96533 | 4/1996 | | |
| JP | 8-096533 | * 12/1996 | ............. | 369/30.27 |
| JP | 2000-251270 | 9/2000 | | |
| JP | 2000-293864 | * 10/2000 | ............. | 369/30.27 |

* cited by examiner

*Primary Examiner*—Tan Dinh
(74) *Attorney, Agent, or Firm*—Staas & Halsey LLP

(57) ABSTRACT

A disc drive to control a home-in mode and method thereof includes a pickup unit irradiating a light beam on a disc loaded in the disc drive, a motor moving the pickup unit along a radius direction of the disc, and a control unit detecting and storing position information of the pickup unit based on driving pulses of the motor. The control unit controls a generation of the driving pulses of the motor using information of a home-in position based on the stored position information of the pickup unit and the driving pulses of the motor.

17 Claims, 3 Drawing Sheets

METHOD AND APPARATUS FOR CONTROLLING POSITIONING OF A PICKUP

CROSS-REFERENCE TO RELATED APPLICATIONS

This application claims the priority of Korean Patent Application No. 2002-42478 filed on Jul. 19, 2002, in the Korean Intellectual Property Office, the disclosure of which is incorporated herein in its entirety by reference.

BACKGROUND OF THE INVENTION

1. Field of the Invention

The present invention relates to a method and apparatus for controlling a home-in mode in a disc drive, and more particularly, to a method and apparatus for accurately controlling a position of a pickup when a disc drive is in a home-in mode.

2. Description of the Related Art

In a home-in mode, a disc drive transfers a pickup to a start position of a lead-in area of a disc loaded in the disc drive.

A conventional home-in mode detects whether the pickup arrives at the home-in position of the disc while moving the pickup to an innermost part of the disc using a sensor, such as a limit switch. However, because an additional device, such as the sensor is required, a cost of the disc drive increases.

In another conventional home-in mode, the pickup is compulsory moved in a direction of the innermost part of the disc by a distance from an outermost part of the disc to a home-in position of the disc. However, the home-in mode does not consider at all a present position of the pickup before the home-in mode is operated. For example, in a case where the pickup is already positioned inwards from the outermost part of the disc, the home-in mode continuously performs a control of moving the pickup to the innermost part, despite the fact that the pickup arrives sooner at the home-in position. Thus, the pickup does not accurately arrive at the home-in position. In addition, although the pickup may have already arrived to the innermost part of the disc drive, the control for moving the pickup to the innermost part may be continuously performed. As a result, noise occurs in the disc drive and a mechanical wear of the disc drive increases, causing the disc drive to easily malfunction.

SUMMARY OF THE INVENTION

Additional aspects and/or advantages of the invention will be set forth in part in the description which follows and, in part, will be obvious from the description, or may be learned by practice of the invention.

According to an aspect of the present invention, there is provided a method and apparatus for controlling a home-in mode in a disc drive in consideration of a present position of a pickup.

The present invention also provides a method and apparatus for accurately controlling a home-in mode of a pickup in a disc drive using a number of driving pulses of a slide transfer motor.

According to an aspect of the present invention, there is provided method to control home-in mode in a disc drive, which includes a pickup, a motor, and a disc loaded in the disc drive. The method includes: detecting and storing information corresponding to a position of the pickup based on a number of driving pulses of the motor, wherein the pickup is moved along a radius direction of the disc; and controlling a generation of the driving pulses of the motor based on home-in position information of the disc loaded in the disc drive and the position information of the pickup.

The position information of the pickup may correspond to a number of driving pulses of the motor. The generation control of the driving pulse may include generating the driving pulses having the number of driving pulses obtained by subtracting the number of driving pulses corresponding to the home-in position from the number of driving pulses corresponding to the position of the pickup. The position information of the pickup may be updated whenever the driving pulses to drive the motor are changed.

According to another aspect of the present invention, there is provided a home-in control apparatus in a disc drive including a pickup unit irradiating a light beam on a disc loaded in the disc drive; a motor moving the pickup unit along a radius direction of the disc; and a control unit detecting and storing position information of the pickup unit based on driving pulses of the motor, and controlling a generation of the driving pulses of the motor using information of a home-in position based on the stored position information of the pickup unit and the driving pulses of the motor.

The control unit detects and stores the number of driving pulses of the motor corresponding to the position of the pickup unit. The control unit controls the generation of the driving pulses based on a number of driving pulses of the motor determined by subtracting the home-in position information from the position information of the pickup unit.

According to an aspect of the present invention, there is provided a home-in control method of a disc drive comprising a pickup unit, a motor, a memory, and a disc loaded in the disc drive, including: reading information of a number of driving pulses corresponding to a position of the pickup unit stored in the memory as a present position of the pickup unit; determining the number of driving pulses of the motor; adding the number of driving pulses of the motor and the number of driving pulses stored in the memory when the pickup unit moves in an outermost direction of the disc and outputting an addition result indicative thereof; subtracting the number of driving pulses of the motor and the number of driving pulses stored in the memory when the pickup unit moves in an innermost direction of the disc and outputting a subtraction result indicative thereof; and storing the addition result or the subtraction result as the present position information of the pickup unit.

According to an aspect of the present invention, there is provided a home-in control method of a disc drive comprising a pickup unit, a motor, a memory, and a disc loaded in the disc drive, including: reading a number of driving pulses of the motor corresponding to a home-in position of the disc and the number of driving pulses corresponding to a present position of the pickup unit from the memory, wherein the number of driving pulses of the motor is determined based on a relationship between a moving distance from an innermost part to an outermost part of the disc, along a radius direction of the disc and a distance between the innermost part and the home-in position of the disc; subtracting the number of driving pulses corresponding to the home-in position from the number of driving pulses corresponding to the present position of the pickup unit and outputting a subtraction result indicative thereof; and controlling a generation of driving pulses of the motor according to the subtraction result.

BRIEF DESCRIPTION OF THE DRAWINGS

The above and/or other aspects and advantages of the present invention will become more apparent by describing in detail preferred embodiments thereof with reference to the attached drawings in which.

DETAILED DESCRIPTION OF THE INVENTION

Hereinafter, aspects of the present invention will be described in detail with reference to the attached drawings. The present invention may, however, be embodied in many different forms and should not be construed as being limited to the aspects set forth herein; rather, these aspects are provided so that the present disclosure will be thorough and complete, and will fully convey the concept of the invention to those skilled in the art.

Figure 1:
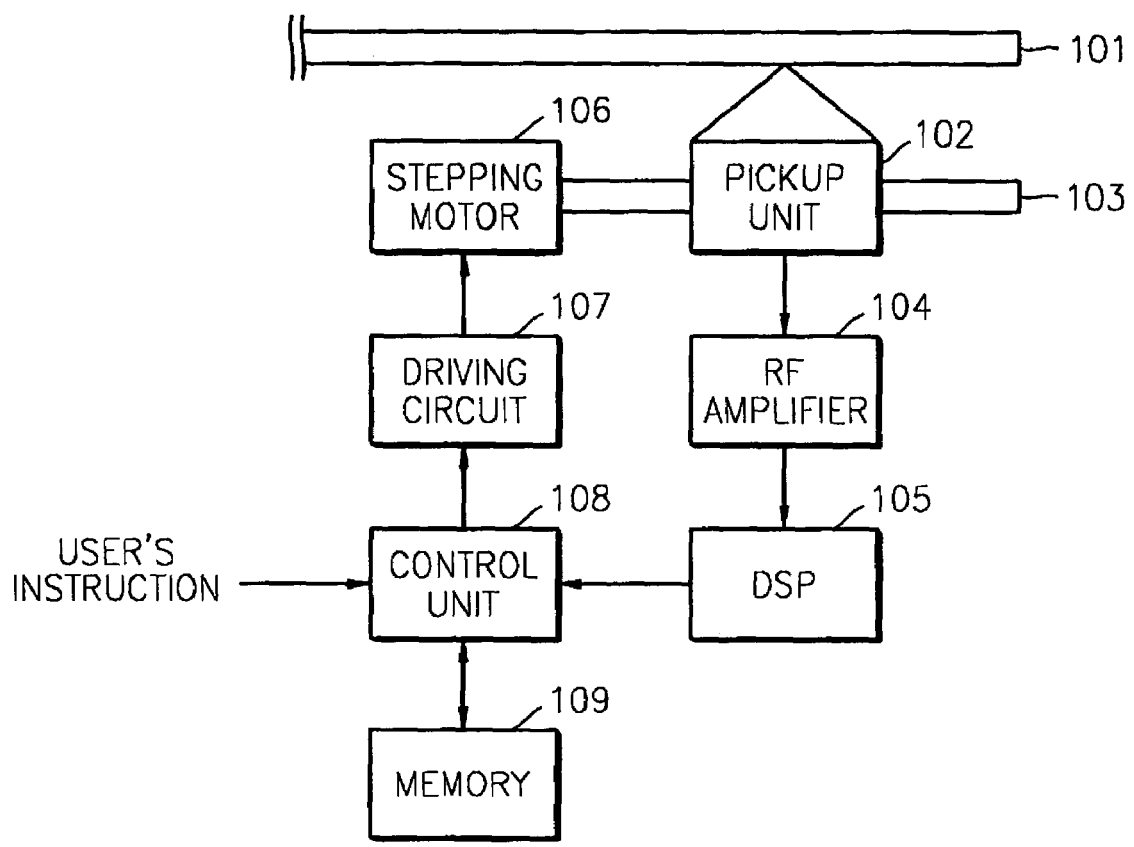
FIG. 1 is a block diagram of a disc drive having a home-in control apparatus, according to an aspect of the present invention.

With reference to FIG. 1, a disc drive, according to an aspect of the present invention, includes a disc 101, a pickup unit 102, an RF amplifier 104, a digital signal processor 105 (referred to hereinafter as a DSP), a stepping motor 106, a driving circuit 107, a control unit 108, and a memory 109.

The disc 101 may be any type of an optical storage medium, such as a compact disc (CD) or a digital versatile disc (DVD). The pickup unit 102 irradiates a light beam on the disc 101 to record data or reproduce the data recorded on the disc 101.

The RF amplifier 104 has the same structure as an RF amplifier included in a conventional disc drive. The RF amplifier 104 amplifies an RF signal output from the pickup unit 104 to a predetermined value. Then, the amplified RF signal is sent to DSP 105, which converts the amplified RF signal into a digital signal and sends the digital signal to the control unit 108.

The control unit 108 determines a number of driving pulses of the stepping motor 106 depending on the digital signal sent from the DSP 105 and a present operation mode of the disc drive. At this time, in a case where the present operation mode is a search mode, the control unit 108 determines the number of driving pulses of the stepping motor 106 in further consideration of information of a target position of the pickup unit 102 determined in response to a user's instruction. The number of driving pulses of the stepping motor 106 is determined using a known method. The control unit 108 inputs a driving control signal to the driving circuit 107 based on the determined number of driving pulses.

The control unit 108 reads information with respect to the number of driving pulses corresponding to positions of the pickup unit 102 stored in the memory 109. At this time, the position information of the pickup unit 102 read by the control unit 108 is a present position of the pickup unit 102.

The control unit 108 calculates the number of driving pulses, which are generated in the driving circuit 107, and the number of driving pulses read from the memory 109. That is, in a case where the driving pulses of the stepping motor 106 are generated to move the pickup unit 102 to an outermost direction of the disc 101, the control unit 108 adds the number of driving pulses that are generated from the driving circuit 107, to the number of driving pulses read from the memory 109. On the other hand, when the driving pulses of the stepping motor 106 are generated to move the pickup unit 102 to an innermost direction of the disc 101, the control unit 108 subtracts the number of driving pulses that are generated from the driving circuit 107, from the number of driving pulses read from the memory 109. Addition and subtraction results are stored in the memory 109 as present position information of the pickup unit 102, thereby updating the position information of the pickup unit 102. That is, the control unit 108 updates the position information of the pickup unit 102 based on the number of driving pulses of the stepping motor 106 generated corresponding to a moving distance of the pickup unit 102, whenever the pickup unit 102 moves.

The driving circuit 107 provides the number of driving pulses corresponding to the driving control signal sent from the control unit 108 to the stepping motor 106.

The stepping motor 106 is a moving motor for the pickup unit 102. The stepping motor 106 is driven according to the number of driving pulses provided from the driving circuit 107 and turns a lead screw 103 directly connected to a rotation axis thereof. Thus, the pickup unit 102 moves along a radius direction or a tracking direction of the disc 101. The lead screw 103 is turned according to a motion of the stepping motor 106 so that the pickup unit 102 is moved to the innermost part or outermost part of the disc 101.

When a home-in mode is set in a state where the position of the pickup unit 102 is controlled by the number of driving pulses of the stepping motor 106, the control unit 108 reads the number of driving pulses corresponding to the home-in position and the number of driving pulses corresponding to the present position of the pickup unit 102, which are stored in advance in the memory 109, and subtracts the number of driving pulses corresponding to the home-in position from the number of driving pulses corresponding to the present position of the pickup unit 102. The control unit 108 determines the number of driving pulses of the stepping motor 106 based on a subtraction result. Further, the control unit 108 sends the driving control signal according to the determined number of driving pulses of the stepping motor 106, to the driving circuit 107.

The driving circuit 107 generates the number of driving pulses according to the applied driving control signal to drive the stepping motor 106. Thus, the pickup unit 102 moves to the home-in position of the disc 101.

The memory 109 stores the number of driving pulses corresponding to the home-in position of the disc 101, and the number of driving pulses corresponding to the present position information of the pickup unit 102.

Figure 2:
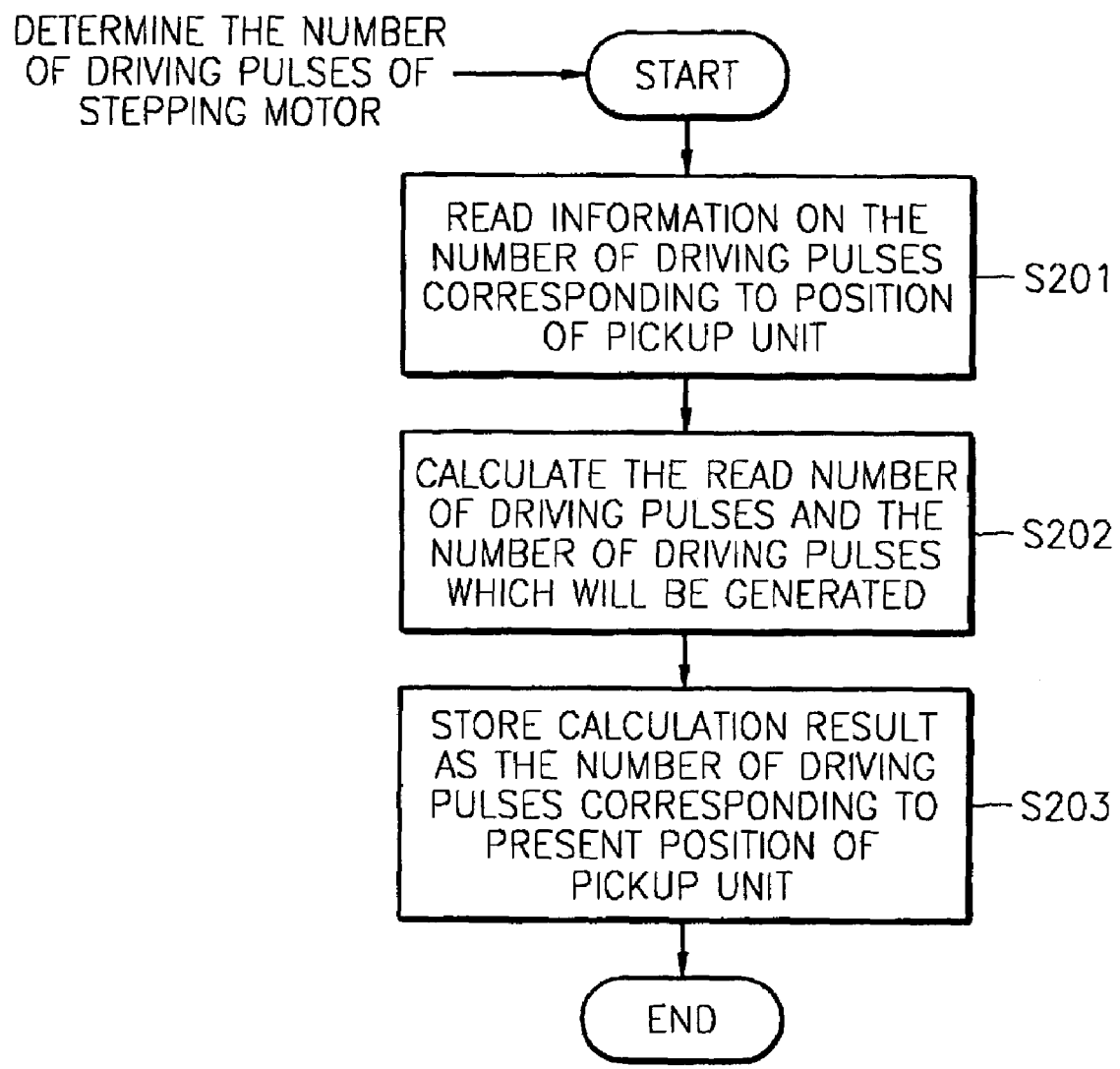
FIG. 2 is a flowchart of a home-in control method to store position information of a pickup, according to an aspect of the present invention.

FIG. 2 is a flowchart of a home-in control method to store the position information of the pickup unit 102, according to an aspect of the present invention.

If the number of driving pulses, which will be generated with respect to the stepping motor 106, is determined, at operation S201, the control unit 108 reads information of the number of driving pulses corresponding to the position of the pickup unit 102 stored in the memory 109. At this time, the position information of the pickup unit 102 read by the control unit 108 is referred to as the present position of the pickup unit 102. The number of driving pulses of the stepping motor 106 is determined using a known method used in the conventional disc drive.

At operation S202, the control unit 108 calculates the number of driving pulses, which are generated by the driving circuit 107, and the number of driving pulses read from the memory 109. That is, when the pickup unit 102 moves in the outermost direction of the disc 101, the number of driving pulses, which are generated by the driving circuit 107, is added to the number of driving pulses read from the memory 109. On the other hands, when the pickup unit 102 moves in the innermost direction of the disc 101, the number of driving pulses, which are generated by the driving circuit 107, is subtracted from the number of driving pulses read from the memory 109.

At operation S203, an operation result obtained at operation S202 is stored in the memory 109 as the number of driving pulses corresponding to the present position information of the pickup unit 102.

Operations S201–S203 are repeatedly performed whenever the driving pulses to drive the stepping motor 106 are generated from the driving circuit 107 to change the position of the pickup 102.

Figure 3:
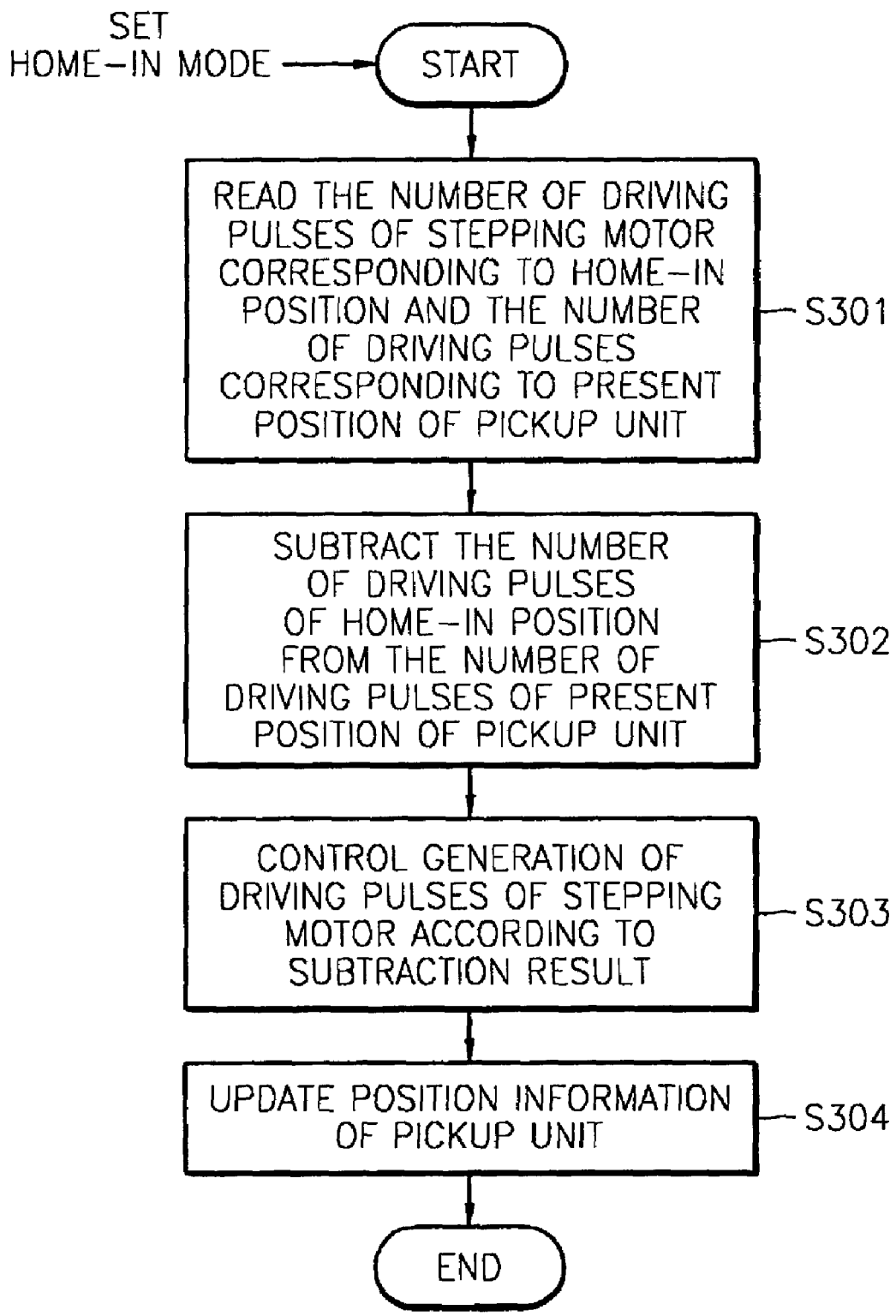
FIG. 3 is a flowchart of the home-in control method to control a position of the pickup, according to an aspect of the present invention.

FIG. 3 is a flowchart of the home-in control method to control the position of the pickup unit 102, according to an aspect of the present invention.

When the home-in mode is set, at operation S301, the control unit 108 reads the number of driving pulses of the stepping motor 106 corresponding to the home-in position of the disc 101, and the number of driving pulses corresponding to the present position of the pickup unit 102 from the memory 109 respectively. The number of driving pulses of the stepping motor 106 corresponding to the home-in position of the disc 101, is determined based on a relationship between the moving distance from the innermost part to the outermost part of the disc 101, along the radius direction of the disc, and the number of driving pulses of the stepping motor 106 corresponding to the moving distance, and a distance between the innermost part and the home-in position of the disc.

At operation S302, the control unit 108 subtracts the number of driving pulses corresponding to the home-in position from the number of driving pulses corresponding to the present position of the pickup unit 102.

At operation S303, the generation of driving pulses of the stepping motor 106 is controlled according to a subtraction result. The subtraction result is expressed as the number of driving pulses. Thus, the control unit 108 controls the driving circuit 107 to generate the number of driving pulses corresponding to the subtraction result.

At operation S304, the control unit 108 updates the position information of the pickup unit 102 stored in the memory 109. At this time, the updated position information of the pickup unit 102 is identical to the position information of the home-in position of the disc 101.

As described above, when a home-in mode is performed in a disc drive, the home-in mode can be accurately controlled, without using a separate sensor, by using information of a present position of a pickup unit and information of the home-in position based on a number of driving pulses of a stepping motor. Further, in the home-in mode, in accordance with an aspect of the present invention, noise and excessive mechanical wear of the disc drive are not generated in the disc drive.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to control home-in mode in a disc drive, which includes a pickup, a motor, and a disc loaded in the disc drive, including:
   detecting and storing information corresponding to a present position of the pickup based on a number of driving pulses of the motor, wherein the pickup is moved along a radius direction of the disc; and
   controlling a generation of the driving pulses of the motor based on home-in position information of the disc loaded in the disc drive and the position information of the pickup,
   wherein the controlling of the generation of the driving pulses comprises generating the driving pulses having the number of driving pulses obtained by subtracting the number of driving pulses corresponding to the home-in position from the number of driving pulses corresponding to the position of the pickup.

2. The method of claim 1, wherein the position information of the pickup correspond to the number of driving pulses of the motor.

3. The method of claim 1, further comprising:
   updating the position information of the pickup when the driving pulses to drive the motor are changed.

4. A disc drive to control a home-in mode, comprising:
   a pickup unit irradiating a light beam on a disc loaded in the disc drive;
   a motor moving the pickup unit along a radius direction of the disc; and
   a control unit detecting and storing present position information of the pickup unit based on driving pulses of the motor, and controlling a generation of the driving pulses of the motor using information of a home-in position based on the stored position information of the pickup unit and the driving pulses of the motors,
   wherein the control unit controls the generation of the driving pulses based on a number of driving pulses of the motor determined by subtracting the home-in position information from the position information of the pickup unit.

5. The disc drive of claim 4, wherein the control unit detects and stores a number of driving pulses of the motor corresponding to the position of the pickup unit.

6. The disc drive of claim 4, wherein the disc comprises a compact disc (CD) or a digital versatile disc (DVD).

7. The disc drive of claim 4, further comprising:
   an RF amplifier amplifying an RF signal output from the pickup unit to a predetermined value; and
   a digital signal processor receiving the amplified RF signal and converting the amplified RF signal into a digital signal, wherein the control unit determines the number of driving pulses of the motor depending on the digital signal sent from the digital signal processor and a present operation mode of the disc drive.

8. The disc drive of claim 4, wherein if the present operation mode is a search mode, the control unit determines the number of driving pulses of the motor and information of a target position of the pickup unit.

9. A disc drive to control a home-in mode, comprising:
   a pickup unit irradiating a light beam on a disc loaded in the disc drive;
   a stepping motor moving the pickup unit along a tracking direction of the disc; and
   a control unit detecting and storing present position information of the pickup unit based on a number of driving pulses of the stepping motor, and controlling a generation of the driving pulses of the stepping motor using information of a home-in position based on the stored position information of the pickup unit and the number of driving pulses of the stepping motor, wherein when the driving pulses of the motor are generated to move the pickup unit to an innermost direction of the disc, the control unit subtracts the number of driving pulses of the motor from the number of driving pulses read from the memory and outputs a subtraction result indicative thereof.

10. A home-in mode control apparatus in a disc drive in a pickup unit and a motor to move the pickup unit, comprising:

a detector detecting present position information of the pickup unit based on the number of driving pulses of the motor;

a memory storing the position information detected from the detector; and a control unit controlling a generation of the driving pulses of the motor using information of a home-in position based on the stored position information of the pickup unit and a number of driving pulses of the motors, wherein when the driving pulses of the motor are generated to move the pickup unit to an outermost direction of the disc, the control unit adds the number of driving pulses of the motor to the number of driving pulses read from the memory and outputs an addition result indicative thereof.

11. The home-in mode control apparatus of claim 10, wherein when the driving pulses of the motor are generated to move the pickup unit to an innermost direction of the disc, the control unit subtracts the number of driving pulses of the motor from the number of driving pulses read from the memory and outputs a subtraction result indicative thereof.

12. The home-in mode control apparatus of claim 10, wherein the addition result is stored in the memory as present position information of the pickup unit to update the position information of the pickup unit.

13. The home-in mode control apparatus of claim 11, wherein the subtraction result is stored in the memory as present position information of the pickup unit to update the position information of the pickup unit.

14. A home-in control method of a disc drive comprising a pickup unit, a motor, a memory, and a disc loaded in the disc drive, comprising:

reading information of a number of driving pulses corresponding to a position of the pickup unit stored in the memory as a present position of the pickup unit;

determining the number of driving pulses of the motor;

adding the number of driving pulses of the motor and the number of driving pulses stored in the memory when the pickup unit moves in an outermost direction of the disc and outputting an addition result indicative thereof;

subtracting the number of driving pulses of the motor and the number of driving pulses stored in the memory when the pickup unit moves in an innermost direction of the disc and outputting a subtraction result indicative thereof; and storing the addition result or the subtraction result as the present position information of the pickup unit.

15. A home-in control method of a disc drive comprising a pickup unit, a motor, a memory, and a disc loaded in the disc drive, comprising:

reading a number of driving pulses of the motor corresponding to a home-in position of the disc and the number of driving pulses corresponding to a present position of the pickup unit from the memory, wherein the number of driving pulses of the motor is determined based on a relationship between a moving distance from an innermost part to an outermost part of the disc, along a radius direction of the disc and a distance between the innermost part and the home-in position of the disc;

subtracting the number of driving pulses corresponding to the home-in position from the number of driving pulses corresponding to the present position of the pickup unit and outputting a subtraction result indicative thereof; and controlling a generation of driving pulses of the motor according to the subtraction result.

16. The home-in control method of claim 15, wherein the subtraction result is the number of driving pulses.

17. The home-in control method of claim 15, further comprising:

updating the position information of the pickup unit stored in the memory, wherein the updated position information of the pickup unit corresponds to the position information of the home-in position of the disc.

* * * * *

UNITED STATES PATENT AND TRADEMARK OFFICE
CERTIFICATE OF CORRECTION

PATENT NO. : 7,193,935 B2
APPLICATION NO. : 10/445025
DATED : March 20, 2007
INVENTOR(S) : Dong-ki Hong et al.

It is certified that error appears in the above-identified patent and that said Letters Patent is hereby corrected as shown below:

Column 6, Line 37, change "motors," to --motor,--.

Column 7, Line 24, change "motors," to --motor,--.

Signed and Sealed this

Seventh Day of August, 2007

JON W. DUDAS
*Director of the United States Patent and Trademark Office*